Patented Sept. 25, 1945

2,385,549

UNITED STATES PATENT OFFICE 2,385,549

PRODUCTION OF ACRYLONITRILE

Le Roy U. Spence, Elkins Park, Pa., assignor to Röhm & Haas Company, Philadelphia, Pa.

No Drawing. Application October 15, 1940, Serial No. 361,264

8 Claims. (Cl. 260—464)

This invention relates to a process for the manufacture of unsaturated aliphatic nitriles, particularly those having the general formula:

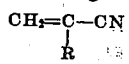

in which R is a hydrogen atom or an alkyl group, by splitting hydrogen chloride out of the corresponding saturated monochloro nitriles.

The object of this invention is to provide a convenient and practical process for converting monochloro saturated aliphatic nitriles, of the general formula:

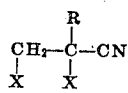

in which R is hydrogen or an alkyl group and one of the X's is hydrogen and the other chlorine, into the unsaturated nitrile of the formula given above. More particularly, the object is to provide a method for the manufacture of acrylonitrile and methacrylonitrile from chloropropionitrile and chloroisobutyronitrile respectively, especially from the α-chloro nitriles.

It has been proposed to convert chlorinated saturated aliphatic nitriles to the corresponding unsaturated nitrile by heating them to relatively high temperatures which causes hydrogen chloride to be split out of the chlorinated nitrile. Such proposal is made in U. S. Patent No. 2,174,756. When treated according to this method, the chlorinated nitriles behave differently depending on the location of the chlorine atom. It is rather difficult to split hydrogen chloride out of the nitriles in which the chlorine atom is attached to the α-carbon atom but with those in which the chlorine is attached to a β-carbon atom it is comparatively easy to do so. Thus, much higher temperatures are required to convert the α-chloro saturated nitriles to the unsaturated nitrile than are necessary for the corresponding conversion of the β-chloro saturated nitriles.

It has now been found that there is also a difference in the behavior of the saturated α- and β-chloro aliphatic nitriles when treated with alkaline materials, particularly aqueous solutions of these materials. At ordinary temperatures strong alkalies, such as sodium or calcium hydroxide, will convert the β-chloronitriles practically quantitatively to the corresponding unsaturated nitrile. Weaker alkalies such as sodium bicarbonate or sodium carbonate will bring about the same conversion at higher temperatures, especially at the boiling point of the solution. In neither case is there any appreciable hydrolysis of the nitrile group provided the amount of alkali employed is only slightly in excess of the amount required to split the hydrogen chloride out of the β-chloronitrile. On the other hand, when the α-chloronitriles are treated with strong alkali even at high temperatures no unsaturated nitrile is formed. In this case the principal reaction is the replacement of the chlorine atom by a hydroxyl group forming the corresponding α-hydroxy nitrile. Some hydrolysis of the nitrile group also takes place. Weaker alkalies, such as sodium carbonate, even at the temperature of the boiling solution do not react readily with the chlorine atom of the α-chloro nitrile so that these nitriles can be boiled with weak alkalies without substantial change. Thus, when a mixture of saturated α- and β-chloronitriles is treated with an alkaline solution, all of the β-chloronitrile is converted to the corresponding unsaturated nitrile whereas the α-chloronitrile remains substantially unchanged.

In the process of pyrolyzing α- or β-chlorinated saturated nitriles or a mixture of the two, the product obtained on condensing the gases contains the unsaturated nitrile, any undissociated chloronitrile and the hydrogen chloride which is split out. However, when the product is cooled to ordinary temperatures the hydrogen chloride and the unsaturated nitrile recombine to a considerable extent to form exclusively the β-chloro saturated nitrile. Attempts to separate any unsaturated nitrile which may be present in such a product by fractional distillation were unsuccessful for the reason that at the boiling point of the mixture some of the β-chloronitrile decomposes, the unsaturated nitrile and the hydrogen chloride thus formed pass over to the condenser and recombine in the condensate. It has been proposed to remove the hydrogen chloride from the reaction product by washing with water. This does not entirely prevent the formation of the β-chloronitrile and, moreover, causes considerable hydrolysis of the nitriles to the corresponding amides and acids which reduces the yield of unsaturated nitrile.

The present invention is designed to overcome these difficulties and provide a process whereby high yields of the unsaturated nitrile can be obtained from the α-chloronitrile. The process consists in heating the α-chloronitrile to split out hydrogen chloride, condensing the products of pyrolysis, treating the condensate with sufficient alkaline material to neutralize the hydrogen chloride and split out hydrogen chloride from the β-chloronitriles formed in the condensate and then fractionally distilling the material to separate the unsaturated nitrile from any unchanged α-chloronitrile. In the pyrolyzing step of the process, the α-chloronitriles are converted to the unsaturated nitrile but, when the products are uncondensed, the hydrogen chloride and the unsaturated nitrile recombine to form the β-chloronitrile which is readily converted to the desired unsaturated nitrile by means of alkaline substances. The starting material may be pure α-chloronitrile or a mixture of α- and β-chloronitriles such as is obtained by the vapor phase chlorination of saturated aliphatic nitriles described in U. S. application Serial No. 353,066 filed August 17, 1940 which on May 19, 1942, issued as Patent No. 2,283,237.

The process is carried out in general as follows:

The pure saturated α-chloronitrile or a mixture of α- and β-chloronitriles is passed through a pyrolyzing zone at a temperature high enough to cause hydrogen chloride to be split out. This may be from about 450 to about 700° C. The optimal range will vary according to the nitrile employed, time of contact, etc. The products issuing from the pyrolyzing zone are passed through a condenser to condense the normally liquid products. The condensate will contain some unsaturated nitrile, dissolved hydrogen chloride, any unchanged α-chloronitrile and considerable β-chloronitrile. The condensate is then treated with a solution or suspension of an alkaline material to neutralize any free hydrogen chloride and to react with the β-chloronitrile to split out hydrogen chloride. The organic and aqueous layers of the resulting mixture are then separated and the organic layer distilled to separate the unsaturated nitrile from the unchanged α-chloronitrile. Alternatively, the aqueous layer may be made neutral and the entire mixture fractionally distilled. In this case the unsaturated nitrile comes over as an azeotropic mixture with water. In either case the α-chloronitrile recovered can be returned to the pyrolyzing step.

The alkali used to neutralize the hydrogen chloride and convert the β-chloronitrile to the unsaturated nitrile may be sodium, potassium, calcium or barium hydroxide, as well as the carbonates and bicarbonates of these metals. These are generally employed in aqueous solutions or suspensions. When a strong alkali, such as sodium hydroxide, or lime, is used the amount employed should be equivalent to the amount of free hydrogen chloride and the β-chloronitrile. If the solution is kept cold, a small excess of the alkali can be employed but this must be neutralized before distillation directly from the solution in order to avoid hydrolysis of the nitriles. When a weak alkali, such as sodium bicarbonate or sodium carbonate, is employed, the mixture may be distilled directly since a small excess of these does not render the solution sufficiently strongly alkaline to cause any appreciable hydrolysis. Heating or even boiling is advantageous with the weak alkalies in order to speed up the conversion of the β-chloronitrile.

As noted above, the optimal temperature for the pyrolyzing step depends to some extent on the nature of the α-chloronitrile. In the case of α-chloropropionitrile 575 to 625° C. is preferred whereas for α-chloroisobutyronitrile 500 to 575° C. gives the best results.

Catalytic materials such as activated alumina, pumice, etc. apparently have little or no effect on the reaction and do not change the proportion of α-chloronitrile which is decomposed in a single passage through the reaction zone. It is advantageous to use an inert packing so as to insure more uniform temperatures in the gas stream and quartz is suitable for this purpose. The inert packing is not necessary as good results are obtained with empty tubes. Other catalysts such as aluminum chloride, ferric chloride, zinc chloride, antimony trichloride and bismuth chloride are also without apparent effect on the pyrolysis of the chloronitriles.

The following examples will illustrate the invention:

Example 1.—One mol of α-chloropropionitrile was passed through a 1" Pyrex tube having a volume of 245 cc. at the rate of four mols per hour at 625° C. The condensate obtained was refluxed with sodium bicarbonate solution and then distilled. 38.2% of the α-chloropropionitrile was consumed of which 69.6% (26.6% of the α-chloropropionitrile feed) was recovered as acrylonitrile. All of the undecomposed α-chloropropionitrile was recovered.

Example 2.—The procedure of Example 1 was repeated using a Pyrex tube packed with pieces of quartz. 47.5% of the α-chloropropionitrile was consumed of which 69.2% (32.8% of the α-chloropropionitrile feed) was recovered as acrylonitrile.

Example 3.—One mol of α-chloropropionitrile was passed through a Pyrex tube at the rate of three mols per hour at 600° C. The condensate was treated with sodium bicarbonate solution and distilled. 34.4% of the α-chloropropionitrile was consumed of which 75.2% (25.8% of the α-chloropropionitrile feed) was recovered as acrylonitrile.

Example 4.—One mol of α-chloropropionitrile was passed through a Pyrex tube at the rate of two mols per hour at 600° C. The condensate was treated with sodium bicarbonate solution and distilled. 48.1% of the α-chloropropionitrile was consumed of which 81.6% (39.4% of the feed) was recovered as acrylonitrile.

Example 5.—One mol of α-chloropropionitrile was passed through a quartz-packed tube of 130 cc. volume at 550° C. at a rate of about one mol per hour. The condensate was passed directly into a solution of sodium bicarbonate. After all the α-chloropropionitrile had been passed, the organic layer was separated from the sodium bicarbonate solution and distilled. 39.4% of the α-chloropropionitrile was consumed of which 58.8% (23.2% of the feed) was recovered as acrylonitrile.

Example 6.—One mol of α-chloropropionitrile was passed through a quartz-packed tube of 130 cc. volume at 600° C. at a rate of about one mol per hour. The condensate was treated with sodium bicarbonate as described in Example 5. 84.7% of the α-chloropropionitrile was consumed of which 62.3% (52.8% of the feed) was recovered as acrylonitrile.

In all of the foregoing examples the unconsumed α-chloropropionitrile was recovered and used in subsequent experiments as the starting material.

The following examples illustrate the difference in behavior of α- and β-chloropropionitrile when treated with alkaline material:

Example 7.—A mixture of 30 g. of acrylonitrile, 30 g. of α-chloropropionitrile and 30 g. of β-chloropropionitrile was mixed with a solution of 40 g. of sodium bicarbonate and 50 g. of distilled water and then distilled through an efficient fractionating column. The first fraction distilling at 67–80° C. amounted to 48 g. and contained 46.1 g. of pure acrylonitrile which is 96.6% of the theoretical amount assuming that all of the β-chloropropionitrile was converted to acrylonitrile. 28 g. of α-chloropropionitrile or 93.3% of the amount used was recovered in the second fraction distilling between 80 and 90° C.

*Example 8.*—A mixture of 0.5 mol each of α- and β-chloropropionitrile and 200 cc. of water was placed in a flask with phenolphthalein as an indicator. Small portions of 20% sodium hydroxide were added and the flask shaken until a permanent slight pink color was obtained. The mixture was then neutralized with hydrochloric acid and 20 g. of sodium bicarbonate was added. The resulting solution was then fractionally distilled. 99.7% of the β-chloropropionitrile was recovered as acrylonitrile and 97.3% of the α-chloropropionitrile as such.

*Example 9.*—A mixture of α- and β-chloropropionitrile was mixed with a slight excess of cold 10% sodium hydroxide solution, stirred vigorously for one-half hour, then the excess sodium hydroxide was neutralized and the mixture was distilled through an efficient fractionating column. A mixture of water and acrylonitrile boiling at 69–71° C. was first obtained, and the acrylonitrile layer was equivalent to 94% of the β-chloropropionitrile used. After the acrylonitrile had been distilled off, a mixture of α-chloropropionitrile and water boiling at 86–91° C. was obtained containing 94% of the CH₃CHClCN used.

*Example 10.*—A mixture of α- and β-chloroisobutyronitrile was treated with 15% sodium hydroxide solution in 10% excess of the β-chloroisobutyronitrile content and the mixture was vigorously stirred for one hour, while holding the temperature at 25–30° C. The excess sodium hydroxide was then neutralized and the oil layer was separated, dried, and fractionally distilled to separate the methacrylonitrile, B. P. 91° C., from the α-chloroisobutyronitrile B. P. 116° C. The recovery was practically quantitative.

I claim:

1. The process of preparing an unsaturated nitrile of the formula:

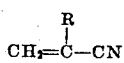

from saturated α-chloronitriles of the formula:

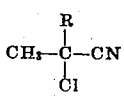

wherein R represents a member of the class consisting of hydrogen and alkyl radicals, which comprises passing vapors of a saturated α-chloronitrile of the above formula through a pyrolyzing zone at a temperature of about 450° C. to about 700° C., condensing the normally liquid products in the vapors therefrom, treating the condensed liquid products with an aqueous alkaline material from the group consisting of the hydroxides, carbonates, and bicarbonates of sodium, potassium, calcium, and barium at a temperature up to and including the boiling point of the mixture to dehydrohalogenate at least part of the condensate, and isolating the resulting unsaturated nitrile.

2. The process of preparing an unsaturated nitrile of the formula:

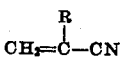

from saturated α-chloronitriles of the formula:

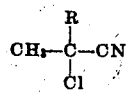

wherein R represents a member of the class consisting of hydrogen and alkyl radicals, which comprises passing vapors of a saturated α-chloronitrile of the above formula through a pyrolyzing zone at a temperature of about 450° C. to about 700° C., condensing the normally liquid products in the vapors threfrom, thereby forming the corresponding β-chloronitrile in preponderant amount, dehydrohalogenating said β-chloronitrile by treating the condensed products with an aqueous alkaline agent from the group consisting of hydroxides, carbonates, and bicarbonates of sodium, potassium, calcium, and barium in an amount at least equivalent to the β-chloronitrile of the condensate and any hydrogen chloride which may be dissolved therein, and isolating the resulting unsaturated nitrile by fractional distillation.

3. The process of preparing an unsaturated nitrile of the formula:

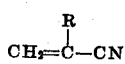

from saturated α-chloronitriles of the formula:

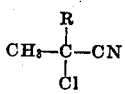

wherein R represents a member of the class consisting of hydrogen and alkyl radicals, which comprises passing vapors of a saturated α-chloronitrile of the above formula through a pyrolyzing zone at a temperature of about 450° C. to about 700° C., condensing the normally liquid products in the vapors therefrom, thereby forming the corresponding β-chloronitrile in preponderant amount, dehydrohalogenating said β-chloronitrile by treating the condensed products with an aqueous alkaline material from the group consisting of hydroxides, carbonates, and bicarbonates of sodium, potassium, calcium, and barium in an amount at least equivalent to the β-chloronitrile of the condensate and any hydrogen chloride present therein and heating the mixture of condensate and aqueous solution to a temperature up to and including the boiling point thereof, neutralizing any excess alkaline material, separating an organic layer from the aqueous solution, and isolating therefrom the resulting unsaturated nitrile.

4. The process of preparing an unsaturated nitrile of the formula:

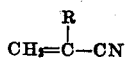

from saturated α-chloronitriles of the formula:

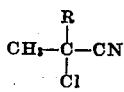

wherein R represents a member of the class consisting of hydrogen and alkyl radicals, which comprises passing vapors of a saturated α-chloronitrile of the above formula through a pyrolyzing zone at a temperature of about 575° C. to about 625° C., condensing the normally liquid products in the vapors therefrom, thereby forming the corresponding β-chloronitrile in preponderant amount, dehydrohalogenating said β-chloronitrile by treating the condensed products with an aqueous dispersion of an alkaline material from the group consisting of hydroxides, carbonates, and bicarbonates of sodium, potassium, calcium, and barium in an amount at least equivalent to the β-chloronitrile content of the condensate and any hydrogen chloride present therein, and isolating the resulting unsaturated nitrile.

5. The process of preparing acrylonitrile from α-chloropropionitrile which comprises passing vapors of α-chloropropionitrile through a pyrolyzing zone at a temperature between about 575° C. and about 625° C., condensing the normally liquid products in the vapors therefrom, thereby forming β-chloropropionitrile in the condensate, treating the condensate with an aqueous dispersion of an alkaline agent from the group consisting of hydroxides, carbonates, and bicarbonates of sodium, potassium, calcium, and barium at a temperature up to and including the boiling point of the mixture of condensate and aqueous dispersion to form acrylonitrile, and isolating the acrylonitrile by fractional distillation.

6. The process of preparing an unsaturated nitrile of the formula:

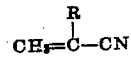

from saturated α-chloronitriles of the formula:

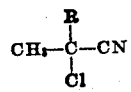

wherein R represents a member of the class consisting of hydrogen and alkyl radicals, which comprises passing vapors of a saturated α-chloronitrile of the above formula through a pyrolyzing zone at a temperature of about 450° C. to about 700° C., condensing the normally liquid products in the vapors therefrom, thereby forming the corresponding β-chloronitrile in preponderant amount, dehydrohalogenating said β-chloronitrile by treating the condensed products with a solution of sodium hydroxide in an amount at least equivalent to the β-chloronitrile of the condensate and any hydrogen chloride dissolved therein, and isolating the resulting unsaturated nitrile by fractional distillation.

7. The process of preparing acrylonitrile from α-chloropropionitrile which comprises passing vapors of α-chloropropionitrile through a pyrolyzing zone at about 575° C. to about 625° C., condensing the normally liquid products in the vapors therefrom, thereby forming β-chloropropionitrile in the condensate, dehydrohalogenating the β-chloropropionitrile in the condensate by treating the latter with an aqueous solution of sodium hydroxide in an amount at least equivalent to the β-chloropropionitrile therein and any hydrogen chloride present therein, and isolating the acrylonitrile by fractional distillation.

8. The process of preparing acrylonitrile from α-chloropropionitrile which comprises passing vapors of α-chloropropionitrile through a pyrolyzing zone at about 575° C. to about 625° C., condensing the normally liquid products in the vapors therefrom, thereby forming β-chloropropionitrile in the condensate, dehydrohalogenating the β-chloropropionitrile in the condensate by treating the latter with an aqueous solution containing an alkaline material from the group consisting of the hydroxides, carbonates, and bicarbonates of sodium, potassium, calcium, and barium and heating the resulting mixture up to and including its boiling point, neutralizing any excess alkaline material, separating an organic layer from the aqueous solution, and isolating acrylonitrile by fractional distillation of the organic layer.

LE ROY U. SPENCE.